US00RE49376E

(19) United States
(12) Reissued Patent
Borup et al.

(10) Patent Number: US RE49,376 E
(45) Date of Reissued Patent: Jan. 17, 2023

(54) PHOTOVOLTAIC POWER PLANT

(71) Applicant: SMA Solar Technology AG, Niestetal (DE)

(72) Inventors: Uffe Borup, Soenderborg (DK); Frerk Haase, Harrislee (DE)

(73) Assignee: SMA Solar Technology AG, Niestetal (DE)

(21) Appl. No.: 15/921,272

(22) Filed: Mar. 14, 2018

Related U.S. Patent Documents

Reissue of:
(64) Patent No.: 9,287,712
Issued: Mar. 15, 2016
Appl. No.: 13/127,813
PCT Filed: Nov. 6, 2009
PCT No.: PCT/DK2009/000231
§ 371 (c)(1),
(2) Date: Jul. 21, 2011
PCT Pub. No.: WO2010/051812
PCT Pub. Date: May 14, 2010

(30) Foreign Application Priority Data

Nov. 7, 2008 (DK) ..... 2008 01537
Jul. 24, 2009 (DK) ..... 2009 00896

(51) Int. Cl.
*H02J 1/00* (2006.01)
*H02J 3/00* (2006.01)
(Continued)

(52) U.S. Cl.
CPC ..... *H02M 7/48* (2013.01); *H02J 3/381* (2013.01); *H02J 3/46* (2013.01); *H02J 2300/24* (2020.01); *Y02E 10/56* (2013.01)

(58) Field of Classification Search
CPC ..... H02J 3/38; H02J 3/383–385; H02M 7/48; H01L 31/02021; Y01T 307/609; Y02E 10/50–58
(Continued)

(56) References Cited

U.S. PATENT DOCUMENTS 5,896,281 A * 4/1999 Bingley ..... H02J 3/40 307/77
6,104,624 A 8/2000 Iwamoto et al.
(Continued)

FOREIGN PATENT DOCUMENTS

CH 698917 B1 * 12/2009 ..... H02J 3/383
DE 20 2006 008 936 U1 8/2006
(Continued)

OTHER PUBLICATIONS

EP (2136449 B1).*
(Continued)

*Primary Examiner* — My Trang Ton
(74) *Attorney, Agent, or Firm* — Eschweiler & Potashnik, LLC

(57) ABSTRACT

In large PV power plants, grounding of individual PV modules may lead to problems. The present invention overcomes such problems. The basis for the invention is a PV power plant comprising one or more PV generators, each comprising a PV string and an inverter with a DC input and an AC output. The PV string comprises at least one PV module and is electrically connected to the DC input of the inverter. The inverter comprises means for controlling the DC potential at the DC input depending on the DC potential at the AC output. The AC outputs of the inverters are coupled in parallel. The novel feature of the invention is that the PV power plant further comprises an offset voltage source, which controls the DC potential at the AC outputs. Thereby, the DC potential at the DC input will be indirectly controlled, and it is thus possible to ensure that the potentials with respect to ground at the terminals of the PV modules are all non-negative or all non-positive without grounding the PV modules. Ground loops can be avoided, and there is no need for the use of transformer-based inverters.

22 Claims, 8 Drawing Sheets

(51) Int. Cl.
*H02M 7/48* (2007.01)
*H02J 3/38* (2006.01)
*H02J 3/46* (2006.01)

(58) Field of Classification Search
USPC ..... 307/63, 82, 87, 89, 151; 363/13, 71, 95, 363/131, 906
See application file for complete search history.

(56) References Cited

U.S. PATENT DOCUMENTS

| | | | | |
|---|---|---|---|---|
| 6,275,403 | B1 * | 8/2001 | McNulty et al. | 363/131 |
| 6,311,137 | B1 | 10/2001 | Kurokami et al. | |
| 7,652,900 | B2 * | 1/2010 | Fukaya | H02J 3/40 363/165 |
| 8,053,930 | B2 * | 11/2011 | Cramer | H02J 3/383 323/361 |
| 8,058,752 | B2 * | 11/2011 | Erickson, Jr. | H02M 7/003 307/150 |
| 8,097,980 | B2 * | 1/2012 | Cyrus | H02J 3/383 307/64 |
| 8,289,742 | B2 * | 10/2012 | Adest | H02M 7/493 363/71 |
| 2005/0139259 | A1 | 6/2005 | Steigerwald et al. | |
| 2009/0279336 | A1 * | 11/2009 | Erdman | H02M 7/53875 363/131 |
| 2009/0315404 | A1 * | 12/2009 | Cramer | H02J 3/383 307/82 |

FOREIGN PATENT DOCUMENTS

| | | | | |
|---|---|---|---|---|
| DE | 202006008936 | U1 * | 9/2006 | |
| DE | 102006012164 | A1 | 7/2007 | |
| EP | 1075064 | A1 | 2/2001 | |
| EP | 1971018 | A1 | 9/2008 | |
| EP | 2136449 | B1 | 2/2010 | |
| HK | 202006008936 | U1 * | 8/2006 | H01L 31/048 |
| JP | 11051977 | | 2/1999 | |
| JP | 2000023372 | A | 1/2000 | |
| WO | WO 2007022955 | A1 | 3/2007 | |
| WO | WO 2009051870 | * | 7/2008 | H01L 31/042 |

OTHER PUBLICATIONS

Novel Grid-Connected Non-isolated Converters.*
DE202006008936.*
Araujo S V et al. "Novel Grid-Connected Non-Isolated Converters for Photovoltaic Systems with Grounded Generator" Power Electronics Specialists Conference, 2008. PESC 2008. IEEE, Piscataway, NJ, USA, Jun. 15, 2008; pp. 58-65 XP03129952.
Search Report for International Application Serial No. PCT/DK2009/000231 dated Feb. 16, 2010.
Suntechnics, Performer Bedienungsanleitung, user manual.
Ciobotaru, F Iov,M., et al, Power Electronics and Control of Renewable Energy Systems,Aalborg University, Institute of Energy Technology, PEDS 2007, P-6 through P-28.
SMA, Module Technology, Optimal Operation of PV Generators with New Technologies, 1/7 through 7/7.
Schaffner, Basics in EMC and Power Quality, Introduction, Annotations, Applications.
SunPower Discovers the "Surface Polarization" Effect in High Efficiency Solar Cells, pp. 1-4.

* cited by examiner

PHOTOVOLTAIC POWER PLANT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is *a reissue of U.S. application Ser. No. 13/127,813 that issued as U.S. Pat. No. 9,287,712 that issued on Mar. 15 2016 that is* entitled to the benefit of and incorporates by reference essential subject matter disclosed in International Patent Application No. PCT/DK2009/000231 filed on Nov. 6, 2009 and Danish Patent Application No. PA 2008 01537 filed Nov. 7, 2008; and Danish Patent Application No. 2009 00896 filed on Jul. 24, 2009.

FIELD OF THE INVENTION

The invention regards a photovoltaic (PV) power plant.

BACKGROUND OF THE INVENTION

In larger PV power plants with DC/AC-converters (inverters), the plant is typically connected to the power grid through a dedicated isolation transformer, which connects the relatively low voltage PV generator system to the medium voltage power grid. One reason for this is that the PV modules, which convert the solar energy into electrical energy, typically must have a defined potential with respect to ground. This is typically achieved by grounding all or some of the PV modules.

Grounding is normally done in order to comply with local regulations, to facilitate the detection of isolation faults and/or to avoid corrosion and/or yield reduction of the PV modules.

Detection of isolation faults may be difficult in larger systems due to the rather high leakage currents from the PV modules, especially in wet conditions. By grounding the system, leakage currents can be monitored.

Some types of PV module, notably thin film modules incorporating a TCO (transparent conductive oxide) layer are prone to irreparable damage, and consequent substantial power losses, resulting from the reaction of glass-sodium with moisture. To avoid accelerated degradation of such PV modules, it is normally required to ground the negative terminal of the PV strings, i.e. avoid that any active part of the PV modules have a negative potential with respect to the ground potential. The degradation of the PV modules depends on the potential difference between the active parts of the module and the ground. Depending on the module construction, grounded parts may be in very close distance from the active parts—accelerating the degradation.

With some other types of PV module, notably those where the terminals are all located on one side of the module—known as 'back contact modules'—a reduction of module efficiency has been observed during operation. This appears to be due to a buildup of static charge on the surface of the cell and can be counteracted by maintaining the cell below the ground potential. Thus, some back-contact PV modules require that the positive terminal is grounded in order to avoid yield losses, i.e. their terminals must have non-positive potentials.

In larger PV systems comprising several strings of PV modules and several inverters, grounding of more than one PV module may cause currents to run through the ground (ground loops). Ground loops may cause problems with controlling the power plant, increase the risk and/or the rate of corrosion and also increase problems relating to electromagnetic interference (EMI). In order to avoid ground loops, transformer-based inverters may be used, so that the DC and the AC sides of the inverters are separated galvanically. Such inverters are however, relatively heavy and expensive, and there is a demand for PV power plants, which may utilise transformer-less inverters and still ensure defined potentials with respect to ground at the PV modules. The use of transformer-less inverters in large PV power plants does however, require that, if ground loops shall be avoided, the PV generator system be configured as a network with an earthing system where the AC side of the inverters has no connection to ground at all. This is known as an 'IT' earthing system and is described in, for example, IEC (International Electrotechnical Commission) International Standard 60364-1—Electrical Installation in Buildings. This means, in practice, that the AC side of the system must be floating with respect to ground and can therefore not be grounded.

FIG. 1 illustrates a typical prior art power plant 22 and comprises a single PV generator 23, comprising a PV string 3 and a transformerless (non galvanically isolated) inverter 24. The inverter 24 has a DC input 18 and a three-phase AC output 19. The PV string 3 comprises three PV modules 5 connected in series and arranged so that they will be exposed to sunlight. Each PV module 5 comprises a number of PV cells (not shown) connected as already known in the art so that they generate a single DC power output at the terminals 6 of the PV module 5. The PV string 3 is electrically connected to the DC input 18 of the inverter 4 through a positive connection 7 and a negative connection 8. The AC outputs 19 are connected electrically in parallel to a power grid 9 comprising three power lines and a neutral line. The neutral line is connected to ground via a ground connection 15.

Here the system is configured as a network with an earthing system where the AC side of the inverter has a connection to ground, and the network also includes a ground connection. This is known as a 'TN' earthing system and is described in, for example, IEC 60364-1.

When operating, the voltages appearing at the positive input 7 and negative input 8 of the inverter 24 are represented in FIG. 2. In the graph the axis 25 represents the voltage with respect to ground, and it will be seen that the voltage at the positive input 7 (represented by the line 27) is above ground potential whilst that at the negative the negative input 8 (represented by the line 28) is below ground potential. These voltages, as well as the potential between them—the voltage across the PV string 3 (represented by the range 26)—are controlled by the characteristics of the inverter 24, the irradiation of the PV string 3, the type of solar cells used in each PV module 5 as well as other factors. Since the grounding of either side of the inverter DC inputs 18 is not possible in this design of power plant, such a power plant 22 will be subject to a decrease in efficiency, and the PV string 3 liable to damage, resulting from the problems discussed above.

FIG. 3 illustrates another prior art power plant 29. Here the difference from the power plant 22 of FIG. 1 is that the PV generator 31 comprises a transformer-based (galvanically isolated) inverter 30, that is to say there is galvanic isolation between the DC input 18 and AC output 19 of the inverter. This allows the grounding of the negative input 8 of the inverter 30 to be made using a ground connection 32. FIG. 4 illustrates the voltages appearing at the DC inputs 18 of the inverter 30 in a similar manner to FIG. 2. In can be seen that the whole PV string 3 is held at a positive potential relative to ground. Such a configuration is suitable for avoiding the problems with thin film modules discussed above. If, alternatively, the positive input 7 of the inverter 30 was grounded instead of the negative input 8, then a configuration suitable for back contact type modules would be realised.

In this type of power plant, whilst it is possible to control the voltages appearing at the inputs 18, and so minimise the decrease in efficiency and damage resulting from the problems discussed above, this advantage comes only at the cost of using a transformer-based inverter (30). Such an inverter design is more expensive to produce, heavier and is less efficient in operation and so the use of such an inverter is clearly a disadvantage. A further disadvantage of this type of power plant is the requirement that a ground connection 32 needs to be physically connected to the positive input 7 or the negative input 8 of the inverter 30. This requires additional hardware and labour to attach. In addition, changing the type of PV modules at a later date may involve the physical disconnection and/or reconnection of a ground connection 32, a procedure which is labour intensive and therefore a disadvantage.

FIG. 5 illustrates yet another prior art power plant 33. Here the difference from the power plant 22 of FIG. 1 is that the AC outputs 19 are connected electrically in parallel to a power grid 9 through a three-phase AC connection 17 and a three-phase isolation transformer 10 having a primary side 11, a secondary side 12 and a neutral terminal 13 on the primary side. Such a transformer is often used in high capacity power plants, where multiple inverters are coupled in parallel, and is described in more detail below. Such a configuration allows the potential of the inverter inputs 18 to be independent of the potential of the network 9 without the need for using a costly transformer-based inverter 31. The grounding of the negative input 8 of the inverter 24 can be made using a ground connection 32. FIG. 4 illustrates the voltages appearing at the DC inputs 18 of the inverter 24 in a similar manner to FIG. 2. In can be seen that the whole PV string 3 is held at a positive potential relative to ground. Such a configuration is suitable for avoiding the problems with thin film modules discussed above. If, alternatively, the positive input 7 of the inverter 24 was grounded instead of the negative input 8, then a configuration suitable for back contact type modules would be realised.

A disadvantage of this type of power plant is the requirement that a ground connection 32 needs to be physically connected to the positive input 7 or the negative input 8 of the inverter 24. This requires additional hardware and labour to attach. In addition, changing the type of PV modules at a later date may involve the physical disconnection and/or reconnection of a ground connection 32, a procedure which is labour intensive and therefore a disadvantage. In addition, if two or more PV generators 23 are connected in parallel, as illustrated in FIG. 6, and one input of each inverter 23 is earthed as described above, problems will arise if the characteristics or irradiation of each PV string 3 are not identical. This may cause unwanted voltages and consequent ground loop currents.

In all the prior art power plants illustrated above it can be seen that whilst the potential of one or more PV strings with respect to ground is an important parameter for running a power plant in an efficient manner and one which does not cause damage to the PV strings, this often only achieved by the use of expensive hardware or the labour intensive fitting of additional hardware.

SUMMARY OF THE INVENTION

Therefore, it is an object of the invention to provide a PV power plant comprising PV strings in which the grounding regime of the PV strings hinders degradation and loss of efficiency.

It is a further object of the invention to provide a PV power plant which easy to adapt to different types of PV string.

It is an even further object of the invention to provide a PV power plant in which the grounding regime of the PV strings is programmable and thus continuously adaptable. The aim of the present invention is to overcome the above mentioned and other drawbacks of known PV power plants.

The basis for the invention in a first aspect is a PV power plant comprising a PV generator, the PV generator comprising a PV string and an inverter with a DC input and an AC output. The PV string comprises at least one PV module and is electrically connected to the DC input of the inverter. The novel feature of the invention is that the PV power plant further comprises an offset voltage source, which controls the DC potential at the AC outputs. Thereby, the DC potential at the DC input will be indirectly controlled, and it is thus possible to ensure that the potentials with respect to ground at the terminals of the PV modules are all non-negative or all non-positive without grounding the PV modules. Thus, ground loops can be avoided, and there is no need for the use of transformer-based inverters. Furthermore, isolation faults in the power plant may be detected by monitoring the current flowing from the offset voltage source.

Preferably, the inverter comprises means for controlling the DC potential at the DC input depending on the DC potential at the AC output. Such means may be dedicated to this function or the function may be a by-product of another function within the inverter.

The PV power plant may also preferably comprise one or more additional PV generators where the AC outputs of all the inverters of these PV generators are coupled in parallel.

Preferably, the output voltage of the offset voltage source depends on the solar irradiation on and/or the ambient temperature of the PV modules. This allows for controlling the potentials at the terminals of the PV modules so that they are as close to ground potential as possible at all times.

The output voltage of the offset voltage source may additionally or alternatively depend on an external reference voltage. This allows for controlling the potentials at the terminals of the PV modules according to any preset potential, or a potential that is set remotely and/or dynamically in order to compensate for factors not immediately accessible to the PV power plant or its components.

The output voltage of the offset voltage source may additionally or alternatively depend on the measured potential of one or more of the inputs to one or more of the inverters. This allows for controlling the potentials at the terminals of the PV modules according to the potential across them produced by irradiation or, alternatively or additionally, according to a requirement to hold one or more of the inverters within certain limits, for example within a certain potential relative to ground.

The output voltage of the offset voltage source may additionally or alternatively is time dependent. This allows for controlling the potentials at the terminals of the PV modules for example according to the time of day. This is an advantage, for example, if a reverse potential is required during the hours of darkness to repair damage caused to 'back contact modules' during daylight hours, or for varying the potential of the PV string throughout the day following the pattern of expected irradiation. Additionally or alternatively a time dependency might follow a yearly or weekly cycle dependent upon a preset pattern connected with ambient temperature or power usage.

In one embodiment of the invention, the offset voltage source may preferably comprise at least one offset PV module. A PV module constitutes a very reliable voltage source, is easy to incorporate into a PV power plant and eliminates the need for installing any additional power generators.

The offset PV modules may preferably be are arranged so that they will be subjected to the same solar irradiation and/or the same ambient temperature as the PV modules. This is a very simple way of achieving that the potentials at the terminals of the PV modules can be as close to ground potential as possible at all times.

Preferably, the output voltage of the offset voltage source may equal approximately half of the output voltage of the PV strings, and the inverters may comprise an electrical equalising circuit, which causes the DC potential at their DC inputs to be symmetric around the average DC potential at their AC outputs. This establishes an even simpler control of the PV module potentials.

The power plant may preferably further comprise an isolation transformer having a primary side connected to the AC outputs, a secondary side and a neutral terminal on the primary side, and the offset voltage source may be connected between ground and the neutral terminal. This is a very simple way of controlling the DC potential at the AC outputs of the inverters.

The AC outputs of the inverters and the isolation transformer may preferably comprise three phases. In this way, a very stable neutral terminal may be achieved.

Alternatively or additionally the offset voltage source may form part of one of the inverter. This would allow for a compact and efficient system. This may preferentially be realised by one inverter becoming a 'controlling' inverter which supplies the DC offset to all the inverters on the isolated AC side of the isolation transformer.

Alternatively or additionally the offset voltage source may be programmable. By this is meant that the offset voltage source can be programmed, by means of inbuilt computer code or other means, to respond in a simple or complex manner to inputs such as temperatures, voltage measurements, time, power usage requirements or other parameters.

Alternatively or additionally the offset voltage source may be able to be turned off. By this is meant that the offset voltage source can be taken out of circuit. This has the distinct advantage that when the offset voltage source is not required (for example during night-time hours when no power is being produced) the power that it uses may be saved resulting in a more efficient PV power plant.

The basis for the invention in a second aspect is realised by a method of controlling a PV power plant, the PV power plant comprising at least one inverter with a DC input electrically connected to a PV string, an AC output and a means for controlling the DC potential at the DC input depending on the DC potential at the AC output, the method comprising that of controlling the DC potential at the AC outputs by use of an offset voltage source.

This aspect of the invention may advantageously be realised by the step of adjusting the voltage of the voltage source to hold the voltage of one of the DC inputs at a voltage offset with respect to ground.

In one embodiment of the method the DC input may be the positive connection, in another embodiment of the method the DC input may be the negative connection.

Alternatively or additionally this aspect of the invention may advantageously be realised by making the voltage offset substantially zero.

Alternatively or additionally this aspect of the invention may advantageously be realised by further the step of turning the offset voltage source off. This is advantageous for the reasons described previously.

BRIEF DESCRIPTION OF THE DRAWINGS

The present invention and its advantages will become more apparent, when looking at the following description of possible embodiments of the invention, which will be described with reference to the accompanying figures, which are showing.

DETAILED DESCRIPTION OF THE PREFERRED EMBODIMENTS

Figure 1:
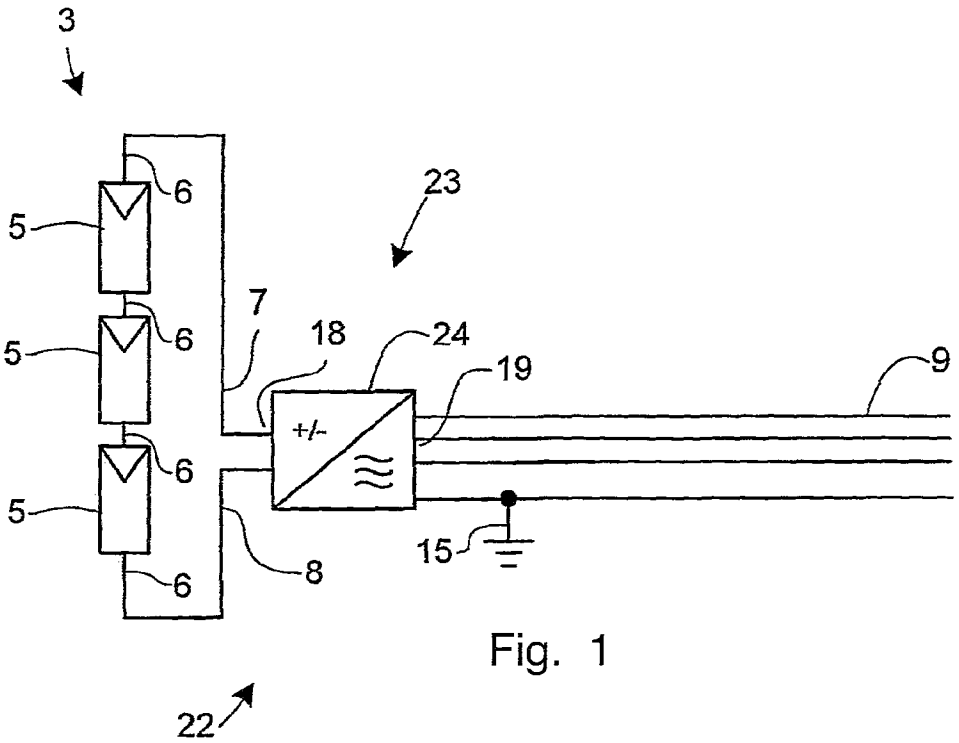
Fig. 1 PRIOR ART
FIG. 1 shows a schematic diagram of a prior art PV power plant.
Figure 2:
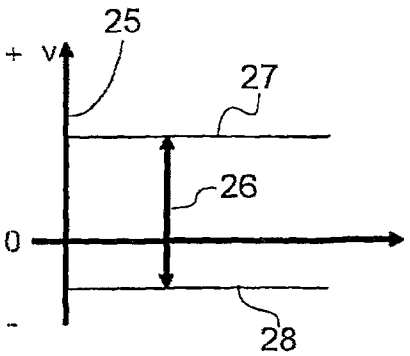
Fig. 2 PRIOR ART
FIG. 2 shows a graph illustrating voltages obtained in the prior art PV power plant shown in FIG. 1.
Figure 3:
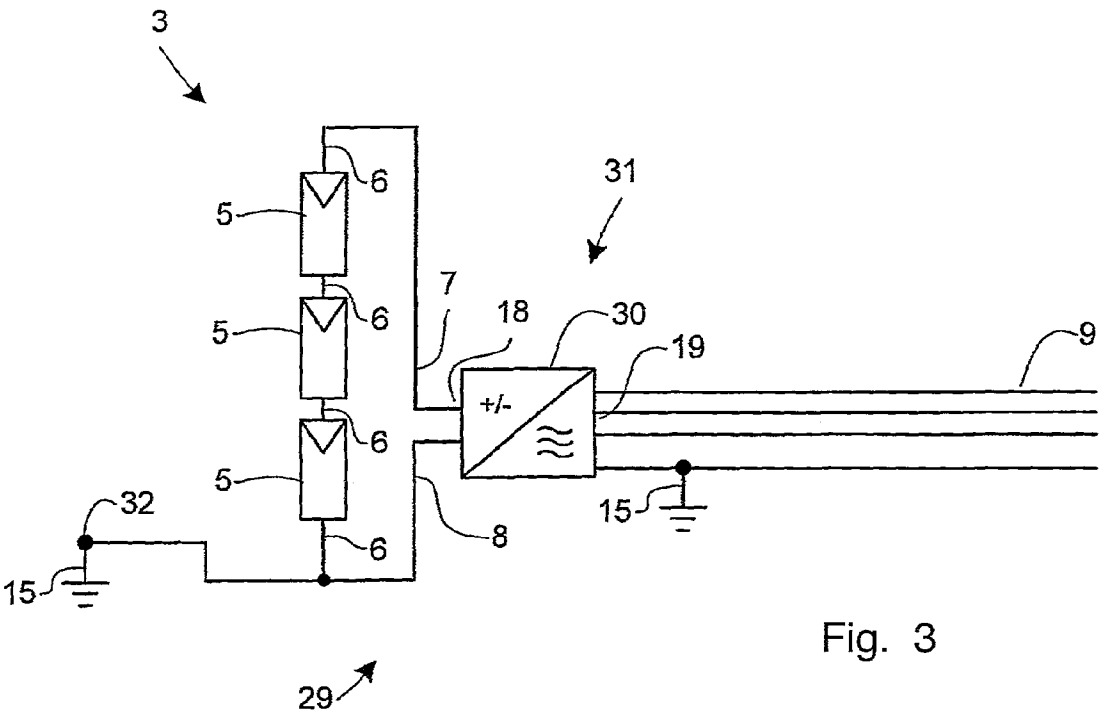
Fig. 3 PRIOR ART
FIG. 3 shows a schematic diagram of another prior art PV power plant.
Figure 4:
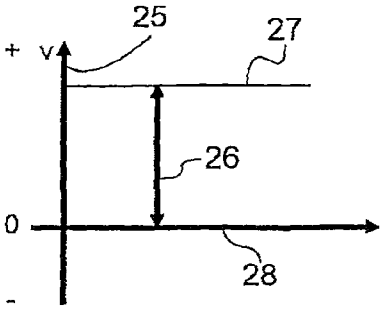
Fig. 4 PRIOR ART
FIG. 4 shows a graph illustrating voltages obtained in the prior art PV power plants shown in FIGS. 3 and 5.
Figure 5:
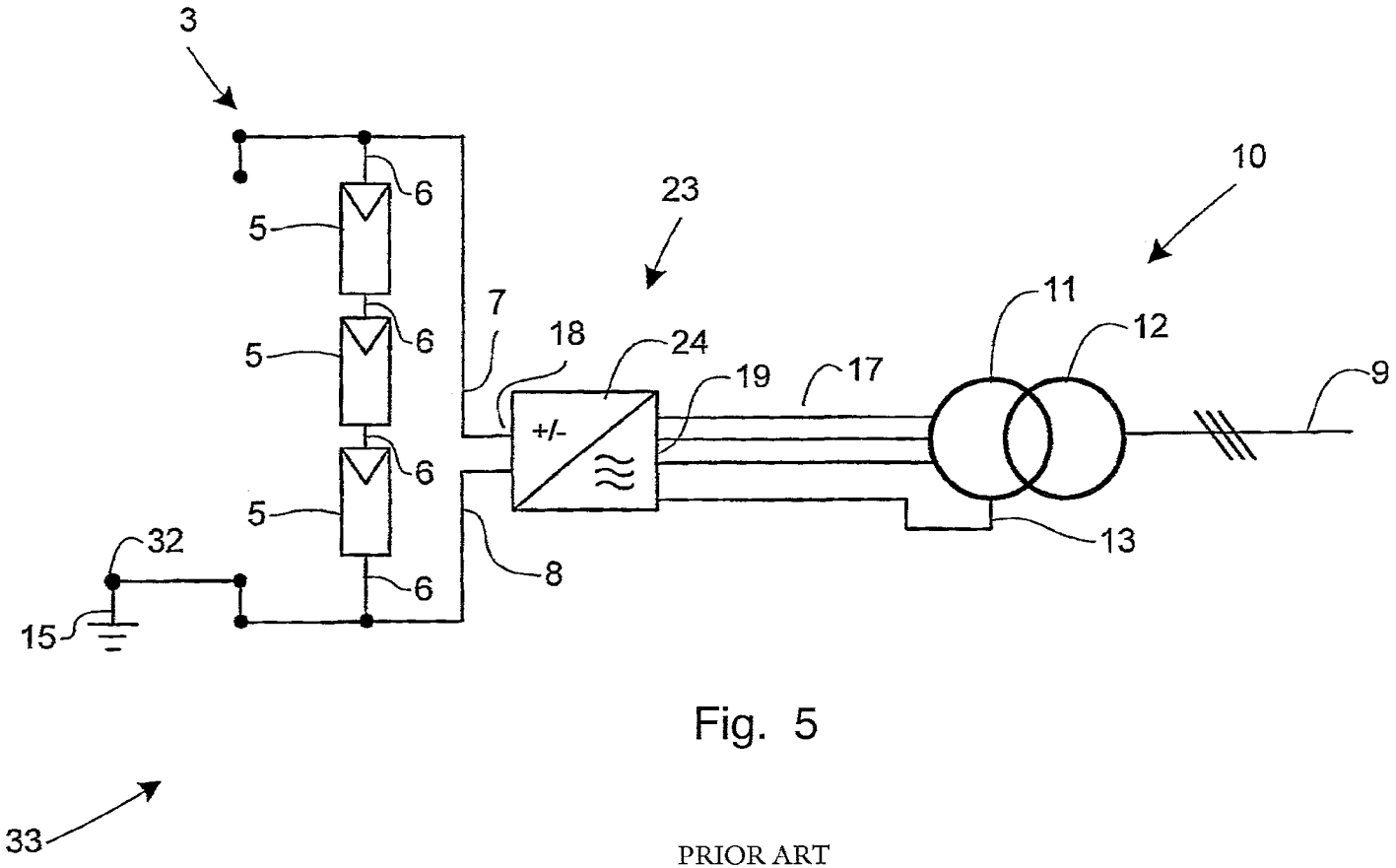
Fig. 5 PRIOR ART
FIG. 5 shows a schematic diagram of yet another prior art PV power plant.
Figure 6:
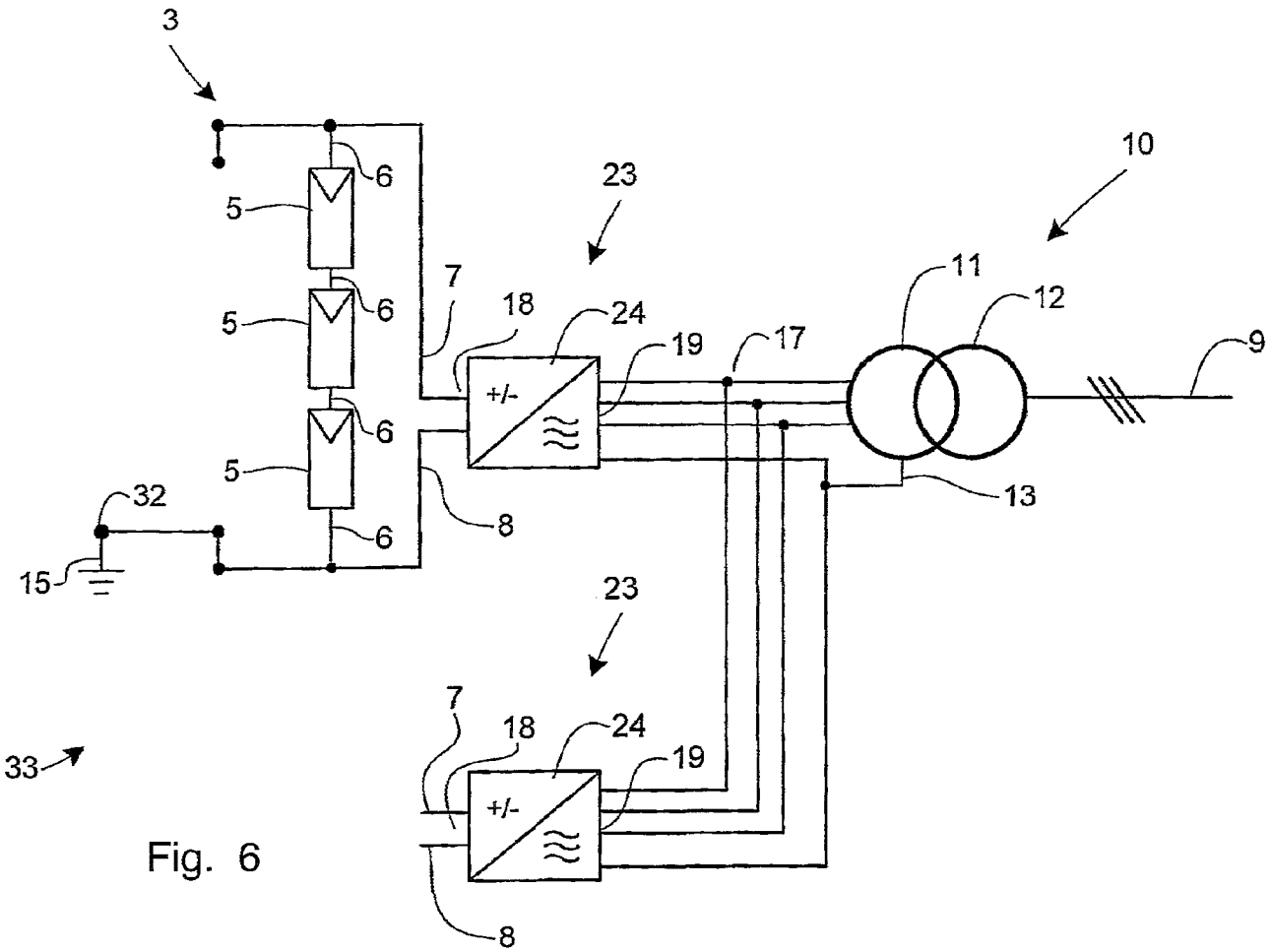
Fig. 6 PRIOR ART
FIG. 6 shows a schematic diagram of a modified form of the prior art PV power plant shown in FIG. 5.
Figure 7:
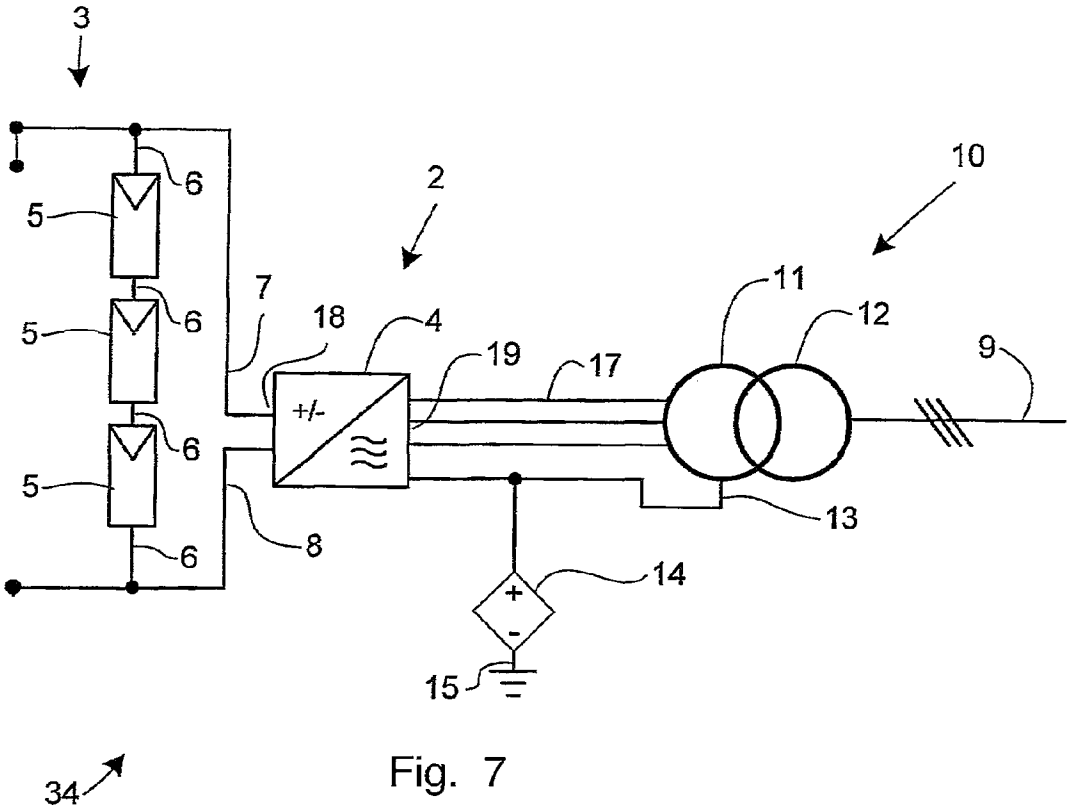
FIG. 7 shows a first embodiment of a PV power plant according to the invention.

The PV power plant 34 of FIG. 7 comprises a PV generator 2, comprising a PV string 3 and an inverter 4. The inverter 4 has a DC input 18 and a three-phase AC output 19. The inverter 4 comprises an electrical equalising circuit, which causes the DC potential at its DC input 18 to be symmetric around the average DC potential at its AC output 19. In its simplest form, the equalisation circuit may comprise a voltage divider based on resistors, inductors and/or capacitors. The PV string 3 comprises three PV modules 5 connected in series and arranged so that they will be exposed to sunlight. Each PV module 5 comprises a number of PV cells (not shown) connected as already known in the art so that they generate a single DC power output at the terminals 6 of the PV module 5. The PV string 3 is electrically connected to the DC input 18 of the inverter 4 through a positive connection 7 and a negative connection 8. The AC outputs 19 are connected electrically in parallel to a power grid 9 through a three-phase AC connection 17 and a three-phase isolation transformer 10 having a primary side 11, a secondary side 12 and a neutral terminal 13 on the primary side. An offset voltage source 14 is electrically connected between ground 15 and the neutral terminal 13.

The PV power plant 34 functions as follows. The PV modules 5 convert the radiation energy received from the sun into electrical energy and thereby generate DC voltages across their terminals 6. Due to the series connection of the PV modules 5, a PV string DC voltage appears between the positive connection 7 and the negative connection 8. In typical PV power plants, the PV string DC voltages may be as high as above 1,000 V. The inverter 4 converts the PV string DC voltage at its DC input 18 into a three-phase AC voltage at its AC output 19, from where it is led to the power grid 9 through the AC connection 17 and the isolation transformer 10. The inverter 4 is controlled by a control system (not shown) to ensure that no electrical power flows from the AC output 19 to the DC input 18. The power plant 34 thus converts solar energy into electrical energy, which is delivered to the power grid 9. The PV string DC voltages and thus the output power of the power plant 34 vary with the irradiation and the ambient temperature as is already known in the art.

The offset voltage is applied to the neutral terminal 13 of the isolation transformer 10, thereby causing the average DC potential at its primary side 11 to be offset from ground potential with the offset voltage. Thus, also the average DC potential with respect to ground 15 at the AC output 19 of the inverter 4 equals the offset voltage. Due to the equalising circuit in the inverter 4, the potentials with respect to ground 15 at the positive connection 7 and the negative connection 8 will be symmetrical around the offset voltage, i.e. approximately zero at one of the connections 7, 8 and approximately twice the offset voltage at the other connection 7, 8. By selecting an appropriate electrical polarity for the offset voltage source 14, it can thus be ensured that the potentials with respect to ground for all PV modules 5 are, for example, either non-negative or non-positive and nearly always very close to ground potential.

Figure 8:
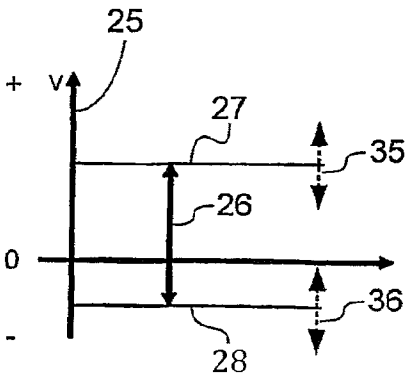
FIG. 8 shows a graph illustrating voltages obtained in the embodiment of the PV power plant shown in FIG. 7.

When operating, the voltages appearing at the positive input 7 and negative input 8 of the inverter 4 are represented in FIG. 8. In this figure the axis 25 represents the voltage with respect to ground, and it will be seen that the voltage at the positive input 7 (represented by the line 27) is above ground potential whilst that at the negative input 8 (represented by the line 28) is below ground potential. These voltages, as well as the potential between them—the voltage across the PV string 3 (represented by the range 26)—are controlled by the characteristics of the inverter 4, the irradiation of the PV string 3, the type of solar cells used in each PV module 5 as well as other factors. The arrows 35 and 36 illustrate that fact that the potentials at the positive 7 and negative 8 inputs of the inverter 4 can be varied by the variation of the voltage output by the offset voltage source 14.

Figure 11:
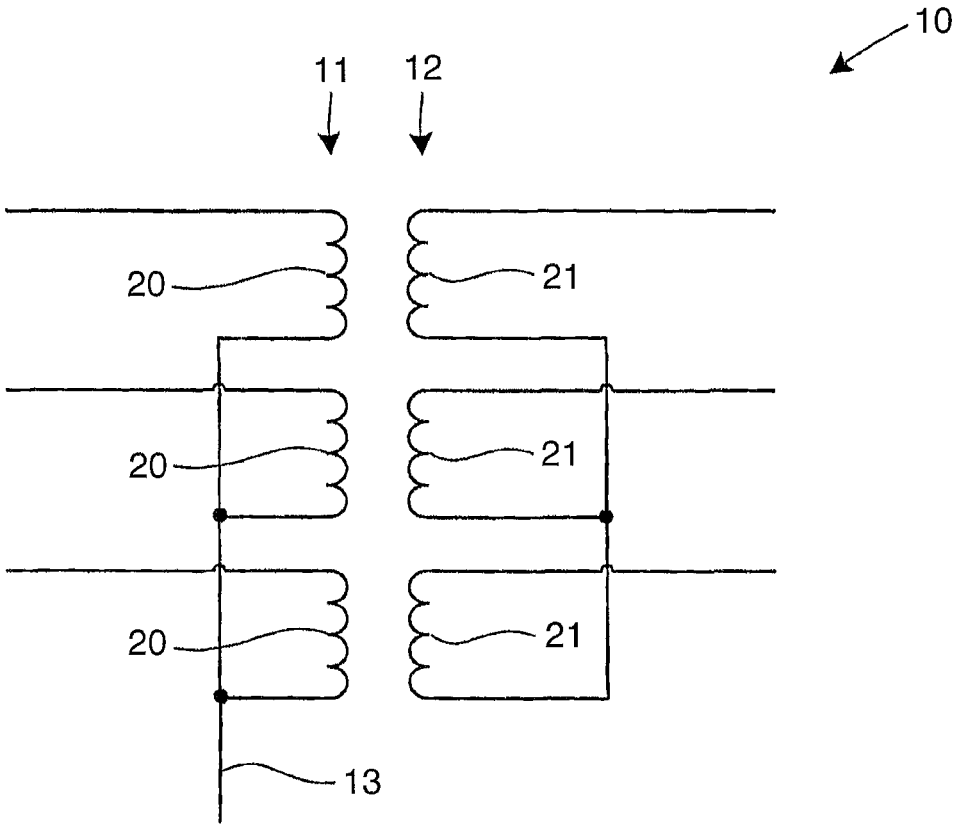
FIG. 11 shows a schematic of an isolation transformer shown in FIGS. 5, 7, 9 and 10.

The isolation transformer 10 shown in FIG. 11 comprises three star-coupled primary windings 20 on the primary side 11 and three star-coupled secondary windings 21 on the secondary side 12. The central connection point of the primary windings 20 constitutes the neutral terminal 13 of the isolation transformer 10.

In the case that the PV modules 5 are of the 'thin film' type, the offset voltage source can be driven so that the whole PV string 3 is held at a positive potential relative to ground. Such a configuration is suitable for avoiding the problems with thin film modules discussed above. If, alternatively, the offset voltage source 14 is driven so that the positive input 7 of the inverter 4 is kept at or near ground potential, then a configuration suitable for back contact type modules is realised. The advantages of this embodiment are clear to see: since there is no requirement for the inverter 4 to be of a transformer-based (galvanically isolated) type, cost and weight can be reduced and efficiency improved.

Figure 9:
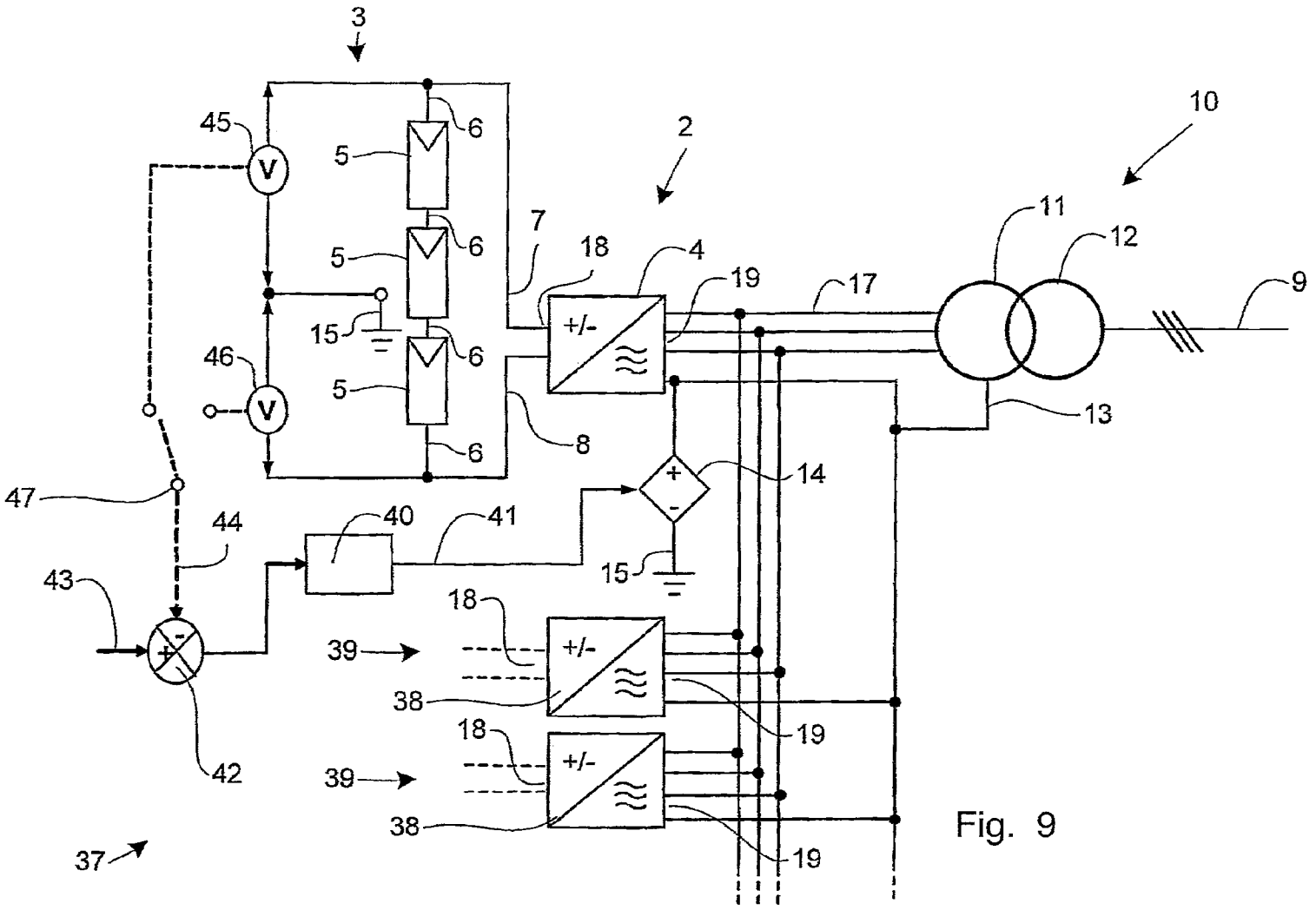
FIG. 9 shows a second embodiment of a PV power plant according to the invention.

Turning now to FIG. 9 we see a second embodiment of a PV power plant according to the invention. This PV power plant 37 is similar to the PV power plant 34 of the first embodiment above, but with the addition of two or more PV generators 39, similar in design to the PV generator 2 of the first embodiment. Again, each PV generator 39 comprises a PV string 3 (not shown) and an inverter 38. Each inverter 38 has a DC input 18 and a three-phase AC output 19. The AC outputs 19 are connected electrically in parallel to a power grid 9 through a three-phase AC connection 17 and a three-phase isolation transformer 10. As before, an offset voltage source 14 is electrically connected between ground 15 and the neutral terminal 13.

FIG. 9 also illustrates a controller 40 which controls the voltage and polarity of the offset voltage source 14 though a control line 41. The signal on the control line 41 is a function of the output of a comparator 42 which compares the output of a voltage measurement 45, 46 with respect to ground 15 and a reference voltage 43. The voltage measurement can be either the voltage of the positive input 7 or the negative input 8 of the inverter 4. The choice of this voltage is made by means of a switch 47. The switch 47 may be a physical switch (for example controlled directly by service personnel), or an electronic switch.

It would, of course, be possible to build the functionality of the controller 40, comparator 42 and switch 47 into the inverter 4. In this case, inverter 4 becomes a 'controller' inverter which supplies the DC offset to all the inverters on the isolated AC side of the isolation transformer 10.

The advantages of this embodiment are similar to the advantages already given for the first embodiment discussed above. In addition, it will be seen that there is no requirement to ground the appropriate input of each inverter 4, 38 individually since the offset voltage source 14 controls the voltage relative to ground on the isolated AC side of all the inverters 4, 38 to a reference point. This reference point could be set to any desired potential between positive or negative side of the PV string and thus compensate for different problems associated with different PV cell type discussed above.

The reference point could also be made programmable, that is it can be varied according to the type of PV string being used, or by some other criteria. It also could be set as a function of time and thus it would be possible to changed the settings of the offset voltage during the day if required.

Since the offset voltage is being produced at a single point in the circuit, and simultaneously alters the potential to ground of all the PV modules 5, there are no voltage differences between the PV modules 5, and no related ground loops between the inverters 4, 38.

Since very little current flows through the voltage source, there is very little power dissipated (often of the order of 1 Watt).

Figure 10:
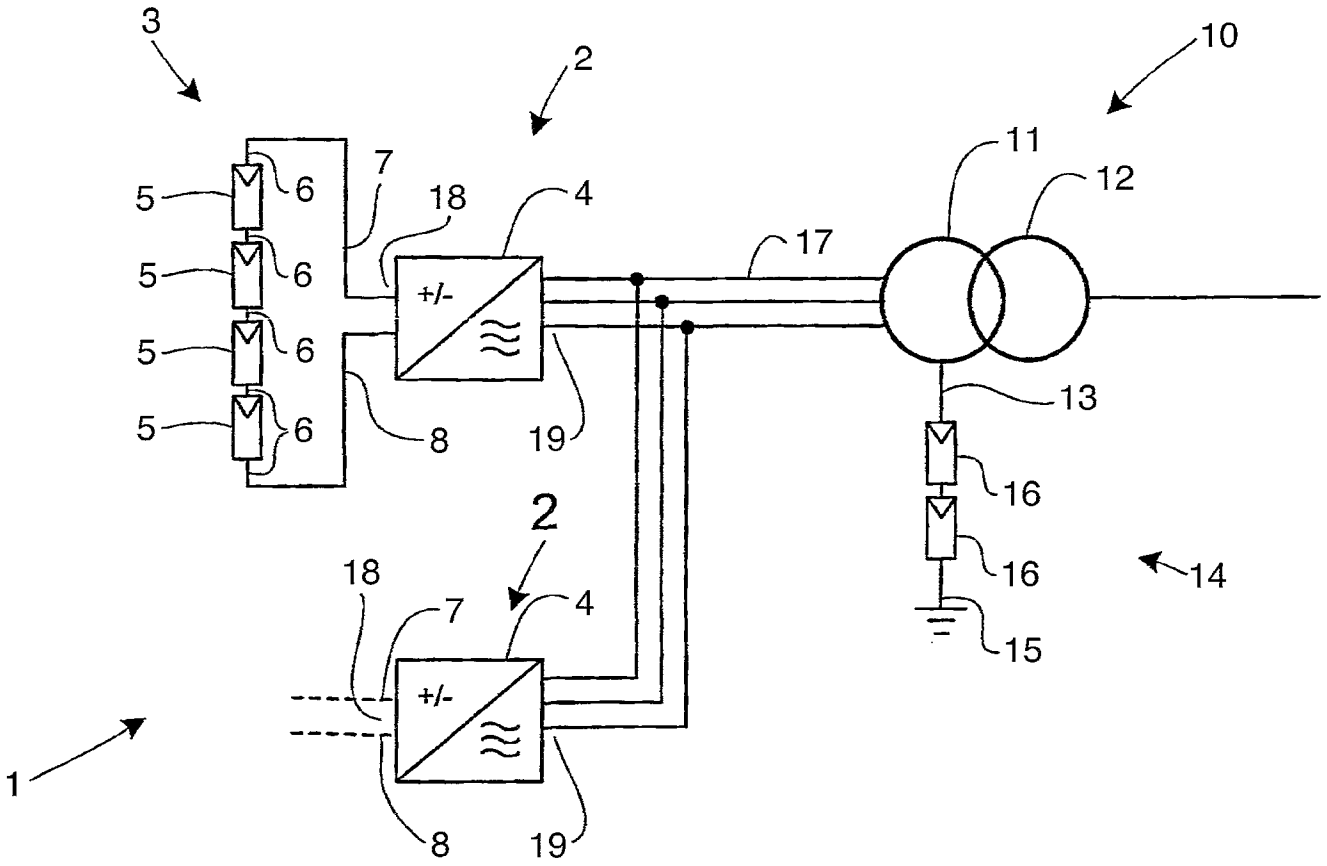
FIG. 10 shows a third embodiment of a PV power plant according to the invention.

FIG. 10 shows a third embodiment of the invention. This is similar to the embodiment illustrated in FIG. 7, but with the addition of a second PV generator 2, and with each PV string 3 comprising four PV modules 5 connected in series. The offset voltage source 14 comprises two offset PV modules 16 connected in series. The offset PV modules 16 are similar in construction to the PV modules 5 of the PV generators 2.

The number of offset PV modules 16 equals half the number of PV modules 5 in a PV string 3, wherefore the output voltage of the offset voltage source 14—the offset voltage—equals approximately half of the PV string DC voltages. Most of the time, the offset voltage source 14 is less loaded than the PV strings, wherefore most of the time, the offset voltage will be a little higher than half of the PV string DC voltages.

Instead of using an equalising circuit, the DC potential at the DC input 18 of the inverters 4 may be controlled actively by the inverter control circuits. This is for instance possible in a transformer-less inverter with an unsymmetrical boost circuit.

Although various embodiments of the present invention have been described and shown, the invention is not restricted thereto, but may also be embodied in other ways within the scope of the subject-matter defined in the following claims.

What is claimed is:

1. A *photovoltaic* (PV) power plant comprising a PV generator, the PV generator comprising a PV string and an inverter with a DC input and an AC output, the PV string comprising at least one PV module and being electrically connected to the DC input, wherein the PV power plant further comprises an offset voltage source, which controls DC potential at the AC output[s], the offset voltage source being connected to an AC side of the inverter between ground and a neutral terminal of the AC output.

[2. The PV power plant according to claim 1, in which the inverter comprises a means for controlling the DC potential at the DC input depending on the DC potential at the AC output.]

3. The *photovoltaic* (PV) power plant according to claim 1, further comprising one or more additional PV generators *each comprising a PV string and an inverter with a DC input and an AC output*, the AC [outputs] *output* of *each of* the inverters being coupled in parallel.

4. The *photovoltaic* (PV) power plant according to claim 1, in which [the] *an* output voltage of the offset voltage source depends on one or more of: [the] *a* solar irradiation of the PV modules, [the] *an* ambient temperature of the PV modules, an external reference voltage and [the] *a* measured potential [of one or more of the] *at the DC* [inputs] *input of the inverter*.

5. The *photovoltaic* (PV) power plant according to claim 1, in which [the] *an* output voltage of the offset voltage source is time dependent.

6. The *photovoltaic* (PV) power plant according to claim 1, in which the offset voltage source comprises at least one offset PV module.

7. The *photovoltaic* (PV) power plant according to claim 6, in which the *at least one* offset PV [modules] *module* is [are] arranged so that [they] *it* will be subjected to the same solar irradiation and/or the same ambient temperature as the *at least one* PV [modules] *module*.

8. The *photovoltaic* (PV) power plant according to claim 1, in which [the] *an* output voltage of the offset voltage source equals approximately half of the output voltage of the PV [strings] *string*, and wherein the inverter comprises an electrical equalising circuit, which causes the DC potential at its DC input to be symmetric around the average DC potential at its AC output.

9. The *photovoltaic* (PV) power plant according to claim 1, in which the power plant further comprises an isolation transformer having a primary side connected to the AC [outputs] *output*, a secondary side and a neutral terminal on the primary side, and that the offset voltage source is connected between ground and the neutral terminal.

10. The *photovoltaic* (PV) power plant according to claim 9, in which the AC [outputs] *output* and the isolation transformer comprise one or more phases.

11. The *photovoltaic* (PV) power plant according to claim 1, in which the offset voltage source forms part of one inverter.

12. The *photovoltaic* (PV) power plant according to claim 1, in which the offset voltage source is programmable and/or can be turned off.

13. A method of controlling a PV power plant, the PV power plant comprising at least one inverter with a DC input electrically connected to a PV string, an AC output and [a means for controlling the DC potential at the DC input depending on the DC potential at the AC output,] *an offset voltage source associated with the AC output,* the method comprising [that of] controlling [the] *a* DC potential at the AC [outputs] *output* by use of [an] *the* offset voltage source connected to an AC side of the at least one inverter between ground and a neutral terminal of the AC output.

14. The method of claim 13 further comprising the step of adjusting the offset voltage of the voltage source to hold the voltage [of one] the DC [inputs] *input* at a voltage offset with respect to ground.

15. The method of claim 14 in which the voltage offset is substantially zero.

16. The method according to claim 13, further comprising the step of turning the offset voltage source off.

17. The *photovoltaic* (PV) power plant of claim 1, wherein the inverter comprises a three-phase AC output.

*18. The photovoltaic (PV) power plant of claim 1, wherein the neutral terminal comprises a central connection point of three star-coupled windings.*

*19. The photovoltaic (PV) power plant of claim 1, wherein the neutral terminal is connected to the inverter.*

*20. A PV power plant comprising a PV generator, the PV generator comprising a PV string and an inverter with a DC input and an AC output, the PV string comprising at least one PV module and being electrically connected to the DC input, wherein the PV power plant further comprises an offset voltage source, which controls DC potential at the AC output, the offset voltage source being connected to an AC side of the inverter between ground and a neutral terminal of circuitry connected to the AC output.*

*21. A system, comprising:*

*an inverter configured to couple to a PV string comprising at least o ne PV module at a DC input thereof, and further configured to couple to an AC grid at an AC output thereof; and*

*an offset voltage source configured to control DC potential at the AC output, wherein the offset voltage source is configured to be connected at an AC side of the inverter between ground and a neutral terminal associated with the AC output.*

*22. The system of claim 21, wherein the neutral terminal comprises a central connection point of three star-coupled windings.*

*23. The system of claim 21, wherein the neutral terminal is connected to the inverter.*

* * * * *